United States Patent
Ichikura

(10) Patent No.: US 11,798,509 B2
(45) Date of Patent: Oct. 24, 2023

(54) DISPLAY DRIVER AND DISPLAY APPARATUS

(71) Applicant: LAPIS Semiconductor Co., Ltd., Yokohama (JP)

(72) Inventor: Hiroyoshi Ichikura, Yokohama (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 0 days.

(21) Appl. No.: 17/602,243

(22) PCT Filed: Apr. 10, 2020

(86) PCT No.: PCT/JP2020/016072
§ 371 (c)(1),
(2) Date: Oct. 7, 2021

(87) PCT Pub. No.: WO2020/209351
PCT Pub. Date: Oct. 15, 2020

(65) Prior Publication Data
US 2022/0199048 A1   Jun. 23, 2022

(30) Foreign Application Priority Data

Apr. 12, 2019 (JP) .................................. 2019-076487

(51) Int. Cl.
*G09G 3/36* (2006.01)
*G09G 3/20* (2006.01)

(52) U.S. Cl.
CPC ............. *G09G 3/3648* (2013.01); *G09G 3/20* (2013.01); *G09G 3/3677* (2013.01);
(Continued)

(58) Field of Classification Search
CPC ...... G09G 3/3648; G09G 3/20; G09G 3/3677; G09G 3/3688; G09G 2310/0275; G09G 2310/0297; G09G 2310/08
See application file for complete search history.

(56) References Cited

U.S. PATENT DOCUMENTS 6,924,784 B1 * 8/2005 Yeo ...................... G09G 3/3688
345/98
7,812,807 B2 * 10/2010 Yano ................... G09G 3/3688
345/99

(Continued)

FOREIGN PATENT DOCUMENTS

JP   2002-215103 A   7/2002
JP   2004-301946 A   10/2004

(Continued)

*Primary Examiner* — Michael J Jansen, II
(74) *Attorney, Agent, or Firm* — Rabin & Berdo, P.C.

(57) ABSTRACT

A display driver drives a display device including a plurality of data lines and a demultiplexer. The demultiplexer includes a plurality of first switches connected to the respective plurality of data lines, and a series of driving voltages including a plurality of driving voltages is supplied via a first wiring. The demultiplexer supplies the plurality of driving voltages to the respective plurality of data lines via the plurality of first switches. The display driver includes: a voltage multiplexing part that generates the series of driving voltages; a second switch connected between the voltage multiplexing part and the first wiring; and a controller connected to the plurality of first switches and the second switch. The controller switches the second switch from an on state to an off state during a first period and sets the two first switches corresponding to the two data lines to the on state such that the two data lines and the first wiring are connected during a second period that is a part of the first period and in which the second switch is in the off state.

3 Claims, 8 Drawing Sheets

(52) U.S. Cl.
CPC ... *G09G 3/3688* (2013.01); *G09G 2310/0275* (2013.01); *G09G 2310/0297* (2013.01); *G09G 2310/08* (2013.01)

(56) References Cited

U.S. PATENT DOCUMENTS

| | | | | |
|---|---|---|---|---|
| 8,068,083 B2* | 11/2011 | Shirai | ................. | G09G 3/3688 |
| | | | | 345/98 |
| 9,047,838 B2* | 6/2015 | Bae | ................. | G09G 3/3607 |
| 9,269,321 B2* | 2/2016 | Jamshidi-Roudbari | | |
| | | | | G09G 3/3688 |
| 9,530,374 B2* | 12/2016 | Jeong | ................. | G09G 3/3685 |
| 9,773,454 B2* | 9/2017 | Kim | ................. | G09G 3/3275 |
| 9,898,978 B2* | 2/2018 | Guo | ................. | G09G 3/3688 |
| 10,108,057 B2* | 10/2018 | Enami | ................. | G09G 3/3648 |
| 10,211,274 B2* | 2/2019 | Kim | ................. | G09G 3/3275 |
| 10,255,871 B2* | 4/2019 | Oh | ................. | G09G 3/3688 |
| 10,262,607 B2* | 4/2019 | Ma | ................. | G09G 3/3614 |
| 10,354,582 B2* | 7/2019 | Kim | ................. | G09G 3/3225 |
| 10,373,565 B2* | 8/2019 | Kwon | ................. | G09G 3/3275 |
| 10,497,294 B2* | 12/2019 | Hong | ................. | G09G 3/006 |
| 10,600,812 B2* | 3/2020 | Hsu | ................. | H01L 27/1218 |
| 10,650,748 B2* | 5/2020 | Kim | ................. | H10K 59/131 |
| 10,726,770 B2* | 7/2020 | Tamura | ................. | G09G 3/32 |
| 10,789,899 B2* | 9/2020 | Ikeda | ................. | G09G 3/3648 |
| 11,119,604 B2* | 9/2021 | Nishio | ................. | G09G 3/3688 |
| 11,200,852 B2* | 12/2021 | Shin | ................. | G09G 3/3233 |
| 11,222,562 B2* | 1/2022 | Gao | ................. | G09G 3/006 |
| 2005/0219195 A1 | 10/2005 | Yano et al. | | |
| 2008/0100605 A1* | 5/2008 | Shirai | ................. | G09G 3/3688 |
| | | | | 345/206 |
| 2010/0134400 A1 | 6/2010 | Chiang et al. | | |
| 2013/0241958 A1* | 9/2013 | Bae | ................. | G09G 3/3607 |
| | | | | 345/204 |
| 2014/0232626 A1* | 8/2014 | Jamshidi-Roudbari | | |
| | | | | G09G 3/3688 |
| | | | | 345/99 |
| 2015/0061983 A1* | 3/2015 | Kim | ................. | G09G 3/3275 |
| | | | | 345/82 |
| 2015/0287378 A1* | 10/2015 | Jeong | ................. | G09G 3/3688 |
| | | | | 345/694 |
| 2016/0189657 A1* | 6/2016 | Oh | ................. | G09G 3/3688 |
| | | | | 345/88 |
| 2016/0240160 A1* | 8/2016 | Ito | ................. | G09G 3/3677 |
| 2017/0033173 A1* | 2/2017 | Kim | ................. | G09G 3/3233 |
| 2017/0076665 A1* | 3/2017 | Kim | ................. | G09G 3/3275 |
| 2017/0221436 A1* | 8/2017 | Guo | ................. | G09G 3/3607 |
| 2017/0309230 A1* | 10/2017 | Kwon | ................. | G09G 3/3275 |
| 2018/0031936 A1* | 2/2018 | Enami | ................. | G02F 1/13458 |
| 2018/0033386 A1* | 2/2018 | Enami | ................. | G02F 1/13452 |
| 2018/0053473 A1* | 2/2018 | Wang | ................. | H01L 27/1214 |
| 2018/0088386 A1* | 3/2018 | Enami | ................. | G09G 3/3648 |
| 2018/0261150 A1* | 9/2018 | Tamura | ................. | G09G 3/2074 |
| 2018/0286332 A1* | 10/2018 | Ma | ................. | G09G 3/3614 |
| 2018/0315384 A1* | 11/2018 | Ikeda | ................. | G09G 3/007 |
| 2019/0027073 A1* | 1/2019 | Hong | ................. | G09G 3/006 |
| 2019/0080651 A1* | 3/2019 | Kim | ................. | H01L 27/3276 |
| 2019/0265858 A1 | 8/2019 | Nishio et al. | | |
| 2019/0386032 A1* | 12/2019 | Hsu | ................. | H10K 59/131 |
| 2020/0184900 A1* | 6/2020 | Shin | ................. | G09G 3/3233 |
| 2021/0175318 A1* | 6/2021 | Kim | ................. | G09G 3/3291 |
| 2021/0209979 A1* | 7/2021 | Gao | ................. | G09G 3/006 |

FOREIGN PATENT DOCUMENTS

| | | |
|---|---|---|
| JP | 2005-208551 A | 8/2005 |
| JP | 2005-257997 A | 9/2005 |
| JP | 2007-334109 A | 12/2007 |
| JP | 2010-102266 A | 5/2010 |
| WO | 2018/088315 A1 | 5/2018 |

\* cited by examiner

DISPLAY DRIVER AND DISPLAY APPARATUS

TECHNICAL FIELD

The present invention relates to a display driver that drives a display device on the basis of a video signal, and a display apparatus.

BACKGROUND ART

A liquid crystal display includes a liquid crystal type display panel as a display device and a display driver driving the display panel.

The display driver includes a DA conversion unit that converts a pixel data piece representing a luminance level of each pixel based on a video signal to a gradation voltage having a voltage value corresponding to the luminance level and a plurality of output amplifiers that amplify the respective plurality of gradation voltages and supply them to a plurality of source lines in the display device (for example, see Patent Document 1). The plurality of output amplifiers supplies a by amplifying the respective gradation voltages to such display driver includes a plurality of external terminals that output the above-described gradation voltage made to correspond to the plurality of source lines in the display device one to one.

Now, in recent years, high definition is required even in a compact liquid crystal display for a vehicle or the like. However, in association with reduction in size of a liquid crystal display, a display driver itself is required to be downsized, and thus, a count of external terminals that can be disposed in the display driver becomes limited.

Therefore, there is proposed a liquid crystal display where a demultiplexer driving a plurality of source lines by one output amplifier in time division is disposed on a display panel (for example, see Patent Document 2).

Patent Document 1: Japanese Unexamined Patent Application Publication No. 2004-301946

Patent Document 2: Japanese Unexamined Patent Application Publication No. 2007-334109

DISCLOSURE OF THE INVENTION

Problems to be Solved by the Invention

When a plurality of source lines are driven by the above-described time division driving, a drive time per one source line is required to be shortened. Consequently, an output amplifier that can charge and discharge a parasitic capacitance of a display device in a high speed is required to be adopted, and thus, there arises a problem that heat generation amount and power consumption of the display driver including the output amplifier increase.

Therefore, it is an object of the present invention to provide a display driver and a display apparatus that can reduce heat generation and power consumption.

Solution to the Problems

A display driver according to the present invention drives a display device including a plurality of data lines and a demultiplexer. The demultiplexer includes a plurality of first switches connected to the respective plurality of data lines. A series of driving voltages including a plurality of driving voltages is supplied to the demultiplexer via a first wiring. The demultiplexer supplies the plurality of driving voltages to the respective plurality of data lines via the plurality of first switches. The display driver comprises: a voltage multiplexing part that generates the series of driving voltages; a second switch connected between the voltage multiplexing part and the first wiring; and a controller connected to the plurality of first switches and the second switch. The controller switches the second switch from an on state to an off state during a first period and sets the two first switches corresponding to the two data lines to the on state such that the two data lines and the first wiring are connected during a second period that is a part of the first period and in which the second switch is in the off state.

A display driver according to the present invention drives a display device including a plurality of data lines and a demultiplexer that receives a series of first to j-th (j is an integer equal to or more than 2) driving voltages at a single wiring and receives first to j-th connection control signals at respective first to j-th wirings. The demultiplexer includes first to j-th switches that individually connect or cut off the single wiring and the respective j data lines on the basis of the first to j-th connection control signals. The display driver comprises: a demultiplexer controller that generates the first to j-th connection control signals that instruct to sequentially connect each of the j data lines to the single wiring one by one only during a second period such that the two data lines are simultaneously connected to the single wiring only during a first period; first to j-th buffers that individually amplify the first to j-th connection control signals to output from respective output terminals; first to j-th output switches that individually connect the output terminals of the respective first to j-th buffers to the first to j-th wirings; a short-circuiting switch part that short-circuits or opens the first to j-th wirings; and an output controller that controls the first to j-th output switches such that, during the first period, connections between the output terminals of the respective first to j-th buffers and the first to j-th wirings are cut off and controls the short-circuiting switch part to cause the first to j-th wirings to be short-circuited one another.

A display apparatus according to the present invention comprises a display device that includes a plurality of data lines and a demultiplexer. The demultiplexer includes a plurality of first switches connected to the respective plurality of data lines. A series of driving voltages including a plurality of driving voltages is supplied to the demultiplexer via a first wiring. The demultiplexer supplies the plurality of driving voltages to the respective plurality of data lines via the plurality of first switches. The display driver includes: a voltage multiplexing part generating the series of driving voltages; a second switch connected between the voltage multiplexing part and the first wiring; and a controller connected to the plurality of first switches and the second switch. The controller switches the second switch from an on state to an off state during a first period and sets the two first switches corresponding to the two data lines to the on state such that the two data lines and the first wiring are connected during a second period that is a part of the first period and in which the second switch is in the off state.

A display apparatus according to the present invention comprises: a display device that includes a plurality of data lines and a demultiplexer that receives a series of first to j-th (j is an integer equal to or more than 2) driving voltages at a single wiring and receives first to j-th connection control signals at respective first to j-th wirings. The demultiplexer includes first to j-th switches that individually connect or cut off the single wiring and the respective j data lines on the basis of the first to j-th connection control signals. The display driver includes: a demultiplexer controller that generates the first to j-th connection control signals that instruct to sequentially connect each of the j data lines to the single wiring one by one only during a second period such that the two data lines are simultaneously connected to the single wiring only during a first period; first to j-th buffers that individually amplify the first to j-th connection control signals to output from respective output terminals; first to j-th output switches that individually connect the output terminals of the respective first to j-th buffers to the first to j-th wirings; a short-circuiting switch part that short-circuits or opens the first to j-th wirings; and an output controller that controls the first to j-th output switches such that, during the first period, connections between the output terminals of the respective first to j-th buffers and the first to j-th wirings are cut off and controls the short-circuiting switch part to cause the first to j-th wirings to be short-circuited one another.

ADVANTAGEOUS EFFECTS OF INVENTION

In the present invention, when each of the plurality of data lines of the display device is sequentially driven via the demultiplexer, by utilizing an electric charge accumulated in a parasitic capacitance in the data line by applying a driving voltage, a parasitic capacitance in the data line to be a next driving target is charged or discharged. When a connection control signal is sequentially supplied to each of the plurality of wirings for transmitting the connection control signal that controls the demultiplexer, by utilizing an electric charge accumulated in a parasitic capacitance in the wiring by supplying the connection control signal, a parasitic capacitance of the wiring to be a next supply target of the connection control signal is charged or discharged.

This allows to reduce the current output by an amplifier that outputs the driving voltage and a buffer that outputs the connection control signal, and thus, power consumption and heat generation can be reduced by that amount.

DESCRIPTION OF PREFERRED EMBODIMENTS

The following describes an embodiment of the present invention in detail with reference to the drawings.

Figure 1:
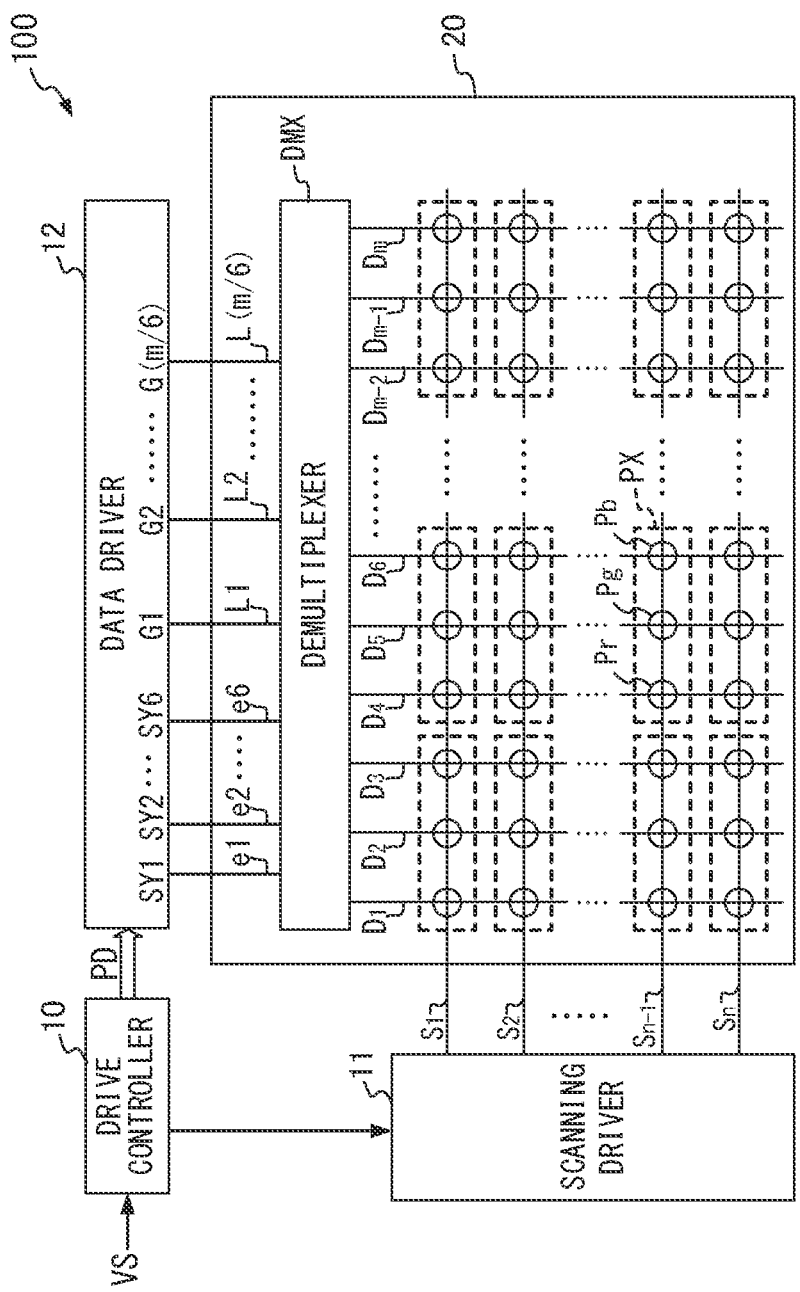
FIG. 1 is a block diagram illustrating a configuration of a display apparatus 100 including a display driver according to the present invention.

FIG. 1 is a block diagram illustrating a configuration of a display apparatus 100 according to the present invention. As illustrated in FIG. 1, the display apparatus 100 includes a drive controller 10, a scanning driver 11, a data driver 12, and a display device 20 having a liquid crystal display panel, an organic EL panel, or the like.

The drive controller 10 receives a video signal VS that includes a horizontal synchronization signal and represents luminance level of each pixel by color components of red color, green color, and blue color. The drive controller 10 generates a scanning signal on the basis of the horizontal synchronization signal included in the video signal VS and supplies the scanning signal to the scanning driver 11. Furthermore, the drive controller 10, on the basis of the video signal VS, supplies video data signal PD including a series of display data pieces that represent the luminance levels by, for example, 8 bits by red color, green color, and blue color to the data driver 12.

The scanning driver 11 generates a scanning pulse on the basis of the scanning signal supplied from the drive controller 10 and applies the scanning pulse sequentially and alternatively to horizontal scanning lines S1 to Sn formed in the display device 20.

The data driver 12 is included in a semiconductor IC as a single semiconductor device or a plurality of semiconductor devices. The data driver 12 captures the above-described video data signal PD and generates voltage values corresponding to the luminance levels represented by the respective display data pieces as m gradation voltages, at capture of one horizontal scanning line, namely, every time m display data pieces are captured. The data driver 12 divides the generated m gradation voltages into (m/6) (m is an integer that is a multiple of 6) gradation voltage groups where each group is constituted of, for example, 6 gradation voltages. Here, the data driver 12, for each (m/6) gradation voltage group, sequentially selects each of the 6 gradation voltages included in the gradation voltage group and generates a series of time division multiplexed gradation voltages. Then, the data driver 12 supplies driving voltage series G1 to G (m/6) obtained by amplifying the respective gradation voltage series for the generated (m/6) system by a gain 1 to the display device 20 as.

Further, the data driver 12 supplies binary (a logic level 0 or a logic level 1) connection control signals SY1 to SY6 that causes 6 data lines D that are output destinations of the 6 driving voltages included in each of the driving voltage series G1 to G (m/6) to be sequentially selected one by one to the display device 20.

The display device 20 includes a demultiplexer DMX, n (n is an integer equal to or more than 2) horizontal scanning lines S1 to Sn extending in a horizontal direction of a two-dimensional screen, and m data lines D1 to Dm extending in a perpendicular direction of the two-dimensional screen. In regions of intersections of the horizontal scanning lines and the data lines, red display cells Pr responsible for red color display, green display cells Pg responsible for green color display, and blue display cells Pb responsible for blue color display are formed. That is, the red display cells Pr are formed on (3·t−2)-th (t is an integer equal to or more than 3) data lines among the data lines D1 to Dm, namely, each of D1, D4, D7, . . . , D(m−2). The green display cells Pg are formed on the data lines arranged at (3·t−1)-th positions among the data lines D1 to Dm, namely, each of D2, D5, D8, . . . , D(m−1). The blue display cells Pb are formed on the data lines arranged at (3·t)-th positions among the data lines D1 to Dm, namely, each of D3, D6, D9, . . . , Dm. Here, as illustrated in FIG. 1, on each of the horizontal scanning lines S1 to Sn, one pixel PX (a region surrounded by a dashed line) is formed by three display cells adjacent to one another, namely, the red display cell Pr, the green display cell Pg, and the blue display cell Pb.

While, in one example illustrated in FIG. 1, the pixel PX is constituted of three display cells of the red display cell Pr, the green display cell Pg, and the blue display cell Pb, one pixel PX may be constituted of a plurality of display cells of four or more. For example, a set of four display cells of [the red display cell Pr, the green display cell Pg, the blue display cell Pb, and the green display cell Pg] may constitute one pixel PX.

Furthermore, the display device 20 includes wirings L1 to L(m/6) where each of which is a single wiring and receives the driving voltage series G1 to G(m/6) output from the data driver 12 and wirings e1 to e6 that receive the respective connection control signals SY1 to SY6.

The demultiplexer DMX, on the basis of the connection control signals SY1 to SY6 received at the wirings e1 to e6, selects the (m/6) data lines among the data lines D1 to Dm and connects each of them to the wirings L1 to L(m/6) one to one. Thus, the demultiplexer DMX applies the driving voltage series G1 to G(m/6) received at the wirings L1 to L (m/6) to the (m/6) data lines selected as described above.

Embodiment 1

Figure 2:
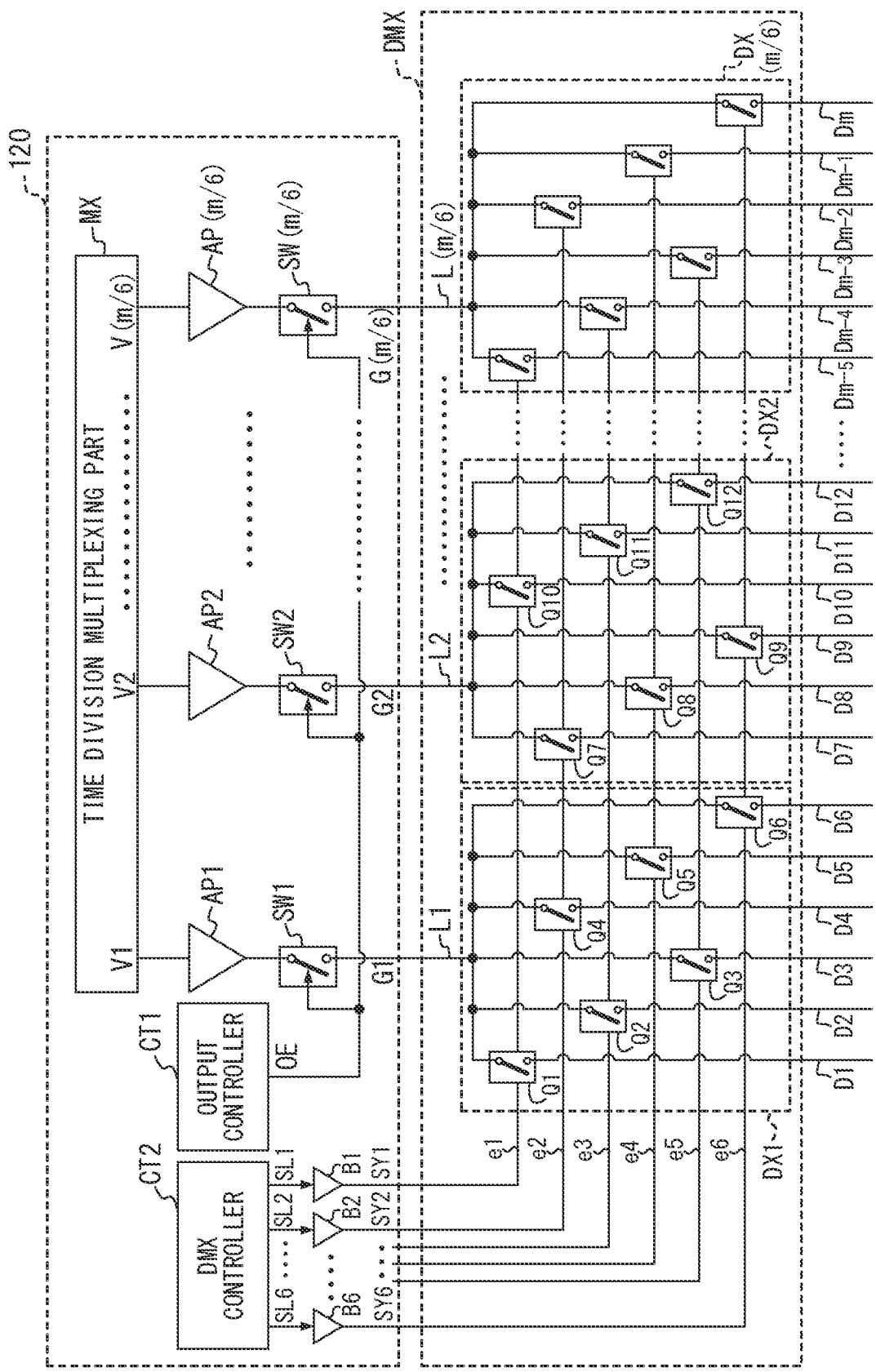
FIG. 2 is a circuit diagram illustrating one example of an internal configuration of an output part 120 and a demultiplexer DMX.

FIG. 2 is a circuit diagram illustrating one example of configuration of an output part 120 that is included in the data driver 12 and outputs the driving voltage series G1 to G(m/6) and the connection control signals SY1 to SY6 and the demultiplexer DMX included in the display device 20.

The output part 120 includes a time division multiplexing part MX, amplifier s AP1 to AP (m/6), output switches SW1 to SW (m/6), an output controller CT1, a demultiplexer controller CT2 (hereinafter referred to as DMX controller CT2), and buffers B1 to B6.

The time division multiplexing part MX divides the m gradation voltages of the above-described 1 horizontal scanning line into the (m/6) gradation voltage groups, each of which is constituted of 6 gradation voltages. Then, the time division multiplexing part MX, for each gradation voltage group, generates gradation voltage series V1 to V (m/6) of the (m/6) system by time division multiplexing of 6 gradation voltages belonging to the gradation voltage group. The time division multiplexing part MX supplies the gradation voltage series V1 to V (m/6) to the amplifiers AP1 to AP (m/6).

Each of the amplifiers AP1 to AP (m/6) amplifies each gradation voltage included in the gradation voltage series V by the gain 1. The output switches SW1 to SW (m/6) disposed corresponding to the respective amplifiers one to one are connected to output terminals of the respective amplifiers AP1 to AP (m/6). Each of the amplifiers AP1 to AP (m/6) supplies the driving voltage series obtained by amplifying each voltage included in the gradation voltage series V by the gain 1 to the corresponding output switch SW via the output terminal itself. For example, the amplifier AP1 receives the gradation voltage series V1 constituted of the series of 6 gradation voltages where the data lines D1 to D6 are output destinations and supplies the driving voltage series obtained by sequentially amplifying the 6 voltages included in the gradation voltage series V1 to the output switch SW1. For example, the amplifier AP2 receives the gradation voltage series V2 constituted of the series of 6 gradation voltages where the data lines D7 to D12 are output destinations and supplies the driving voltage series obtained by sequentially amplifying the 6 voltages included in the gradation voltage series V2 to the output switch SW2.

The output controller CT1 generates a binary output control signal OE having the logic level 1 when the output switch is set to an on state and the logic 0 when the output switch is set to an off state.

The output switches SW1 to SW (m/6) becomes in the on state when the output control signal OE represents the on state and individually electrically connects the output terminals of the respective amplifiers AP1 to AP (m/6) to each of the wirings L1 to L (m/6) of the display device 20.

The output switches SW1 to SW(m/6) individually receive the driving voltage series output from each of the amplifiers AP1 to AP (m/6) and supplies each of them as the driving voltage series G1 to G(m/6) to the demultiplexer DMX of the display device 20, in the on state describe above. On the other hand, when the output control signal OE represents the off state, the output switches SW1 to SW(m/6) become in the off state. Thus, the connections between the output terminals of the respective amplifies AP1 to AP (m/6) and the respective wirings L1 to L (m/6) are cut off, and the output terminals of the respective amplifies AP1 to AP(m/6) are set to a high impedance state.

The DMX controller CT2 generates connection control signals SL1 to SL6 where each of them sequentially transitions from a state of the logic level 0 representing "non-selection" to a state of the logic level 1 representing "selection" one by one and the state is maintained only for a predetermined period. At this time, the DMX controller CT2, at a time point before the time point when one of the connection control signal SL of the connection control signals SL1 to SL6 transitions from the logic level 1 to the logic level 0, causes the next connection control signal SL to transition from the logic level 0 to the logic level 1.

That is, the DMX controller CT2 generates the connection control signals SL1 to SL6 for controlling the demultiplexer DMX to sequentially connect each of the 6 data lines to a single wiring L one by one only for a second period such that two data lines D are simultaneously connected to the single wiring L only for a first period.

Then, the DMX controller CT2 supplies the connection control signals SL1 to SL6 generated as described above to the buffers B1 to B6.

The buffers B1 to B6 output the connection control signals SY1 to SY6 obtained by individually amplifying the connection control signals SL1 to SL6 from the respective output terminals. The connection control signals SY1 to SY6 output from the buffers B1 to B6 are supplied to the demultiplexer DMX of the display device 20.

The demultiplexer DMX is disposed corresponding to the respective driving voltage series G1 to G(m/6) and has 1 to 6 demultiplexers DX1 to DX(m/6) individually connected to the respective wirings L1 to L(m/6) described above. For example, in FIG. 2, the 1 to 6 demultiplexer DX1 corresponding to the driving voltage series G1 is connected to the single wiring L1, and the 1 to 6 demultiplexer DX2 corresponding to the driving voltage series G2 is connected to the single wiring L2.

Further, the respective 1 to 6 demultiplexers DX1 to DX(m/6) are disposed corresponding to a data line group of a (m/6) system where the data lines D1 to Dm are divided by 6 lines. That is, the respective 1 to 6 demultiplexers DX1 to DX(m/6) are connected to data lines that belong to the data line group corresponding to itself, namely, 6 data lines D that are output destinations. For example, the 1 to 6 demultiplexers DX1 is connected to the data lines D1 to D6 that are the output destinations, and the 1 to 6 demultiplexers DX2 is connected to the data lines D7 to D12 that are the output destinations.

Each of the 1 to 6 demultiplexers DX1 to DX(m/6) includes 6 switches that select one or two of the data lines D, which are the output destinations, on the basis of the connection control signals SY1 to SY6(SL1 to SL6) and supply the driving voltage series G received via the wiring L to the selected data lines. For example, the 1 to 6 demultiplexer DX1 includes switches Q1 to Q6, and the 1 to 6 demultiplexer DX2 includes switches Q7 to Q12.

The switches Q1 to Q6 (Q7 to Q12) receive the driving voltage series G1 (G2) via the single wiring L1 (L2).

Here, the switch Q1 (Q10) becomes in the on state only when the connection control signal SY1 received at the wiring e1 shows "selection" and supplies the driving voltage series G1 (G2) to the data line D1 (D10). The switch Q2 (Q11) becomes in the on state only when the connection control signal SY3 received at the wiring e3 shows "selection" and supplies the driving voltage series G1 (G2) to the data line D2 (D11). The switch Q3 (Q12) becomes in the on state only when the connection control signal SY5 received at the wiring e5 shows "selection" and supplies the driving voltage series G1 (G2) to the data line D3 (D12). The switch Q4 (Q7) becomes in the on state only when the connection control signal SY2 received at the wiring e2 shows "selection" and supplies the driving voltage series G1 (G2) to the data line D4 (D7). The switch Q5 (Q8) becomes in the on state only when the connection control signal SY4 received at the wiring e4 shows "selection" and supplies the driving voltage series G1 (G2) to the data line D5 (D8). The switch Q6 (Q9) becomes in the on state only when the connection control signal SY6 received at the wiring e6 shows "selection" and supplies the driving voltage series G1 (G2) to the data line D6 (D9).

With such configuration, for example, the 1 to 6 demultiplexer DX1 sequentially supplies 6 driving voltages in the driving voltage series G1 output from the amplifier AP1 of the data driver 12 one by one to the data lines D1, D2, D3, D4, D5, and D6, which are the respective output destinations. For example, the 1 to 6 demultiplexer DX2 sequentially supplies 6 driving voltages in the driving voltage series G2 output from the amplifier AP2 of the data driver 12 one by one to the data lines D7, D8, D9, D10, D11, and D12, which are the respective output destinations.

The following describes operations executed by the output controller CT1 and the DMX controller CT2, by extracting the output switch SW1 and the 1 to 6 demultiplexer DX1 from the configuration illustrated in FIG. 2.

Figure 3:
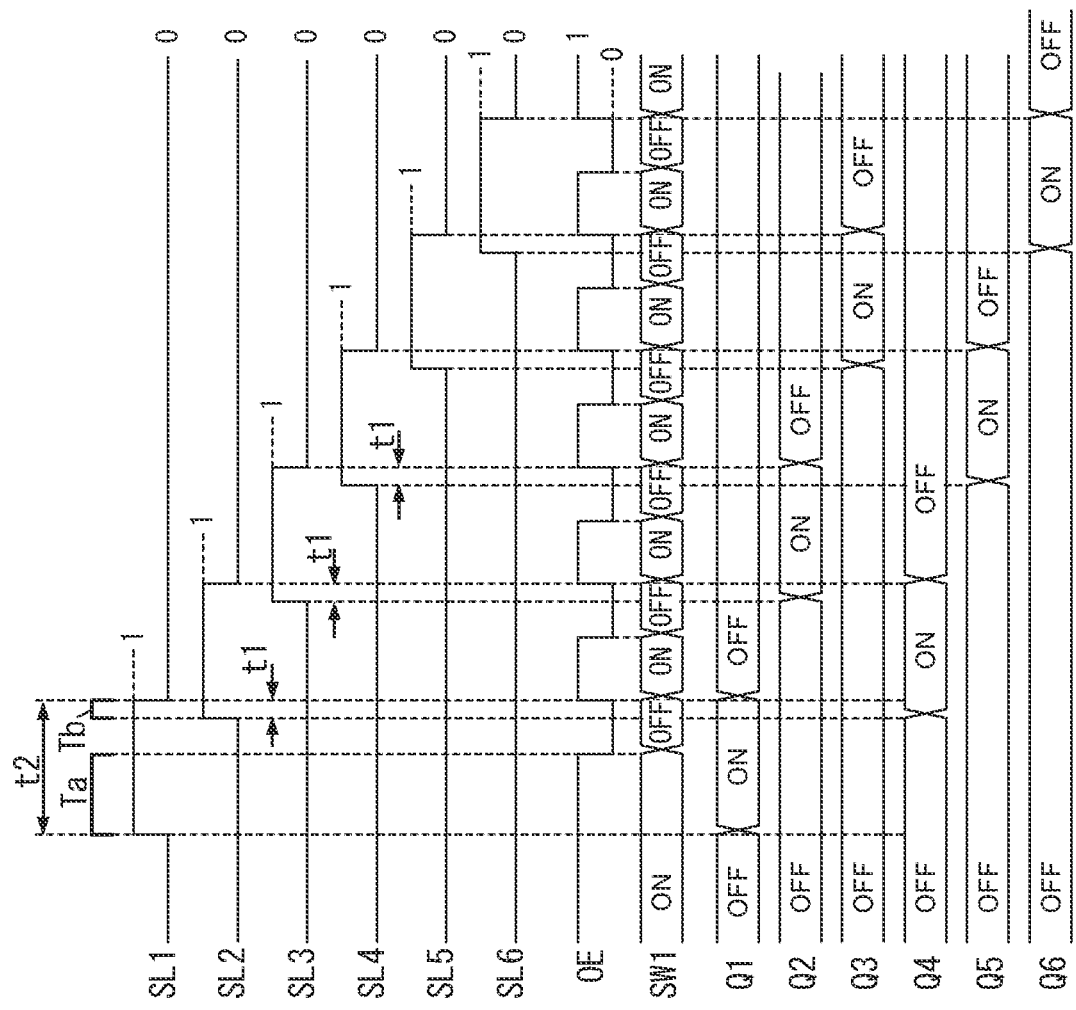
FIG. 3 is a timing chart illustrating an output control signal OE and connection control signals SL1 to SL6, and operating states of switches Q1 to Q6.

FIG. 3 is a timing chart that represents one example of the output control signal OE generated by the output controller CT1 and the connection control signals SL1 to SL6 generated by the DMX controller CT2 and operation states of the switches Q1 to Q6 included in the DX1 and output switch SW1.

The DMX controller CT2 generates the connection control signals SL1 to SL6 that transition from the logic level 0 representing "non-selection" to the logic level 1 representing "selection" in the order of the connection control signals SL1, SL2, SL3, SL4, SL5, and SL6. That is, the DMX controller CT2 as illustrated in FIG. 3, generates the connection control signals SL1 to SL6 where two connection control signals SL simultaneously become the logic level 1 only during a first period t1 and each connection control signal sequentially transitions from the logic level 0 to the logic level 1 one by one and maintains the state only during a second period t2 (t2>t1).

As shown in FIG. 3, the switches Q1 to Q6 transition from the off state to the on state in the order of Q1, Q4, Q2, Q5, Q3, and Q6 on the basis of the connection control signals SL1 to SL6. Thus, 6 driving voltages in the driving voltage series G1 are supplied one by one to the respective data lines in the order of data lines D1, D4, D2, D5, D3, and D6.

The output controller CT1, as illustrated in FIG. 3, maintains the on state during an interval Ta from a time point when each of the switches Q1 to Q6 transitions from the off state to the on state to an elapse of a predetermined period, and generates the output control signal OE that becomes the logic level 0 during an interval Tb where two switches Q simultaneously become in the on state.

Figure 4A:
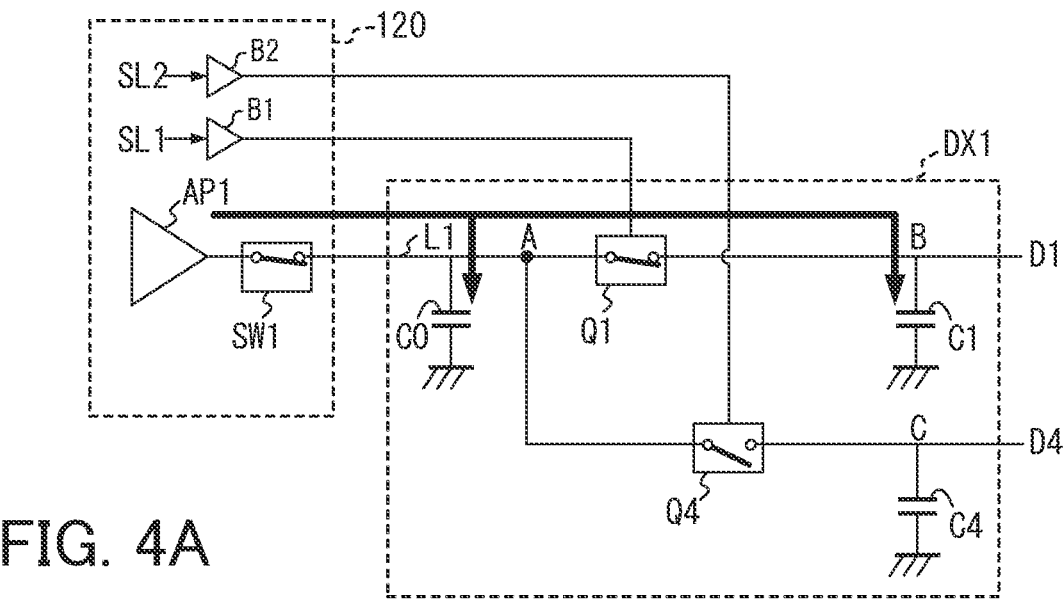
FIG. 4A is a circuit diagram illustrating a flow of an electric charge flowing through a circuit constituted of an amplifier AP1, an output switch SW1, and switches Q1 and Q4 included in the demultiplexer DX1, during an interval Ta.
Figure 4B:
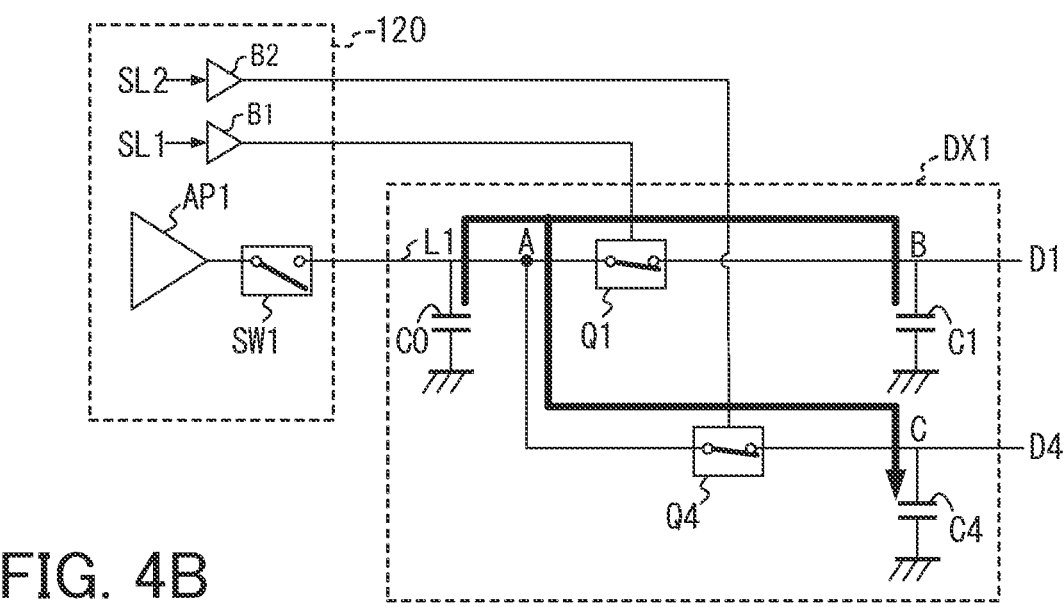
FIG. 4B is a circuit diagram illustrating a flow of an electric charge flowing through the circuit constituted of the amplifier AP1, the output switch SW1, and the switches Q1 and Q4 included in the demultiplexer DX1, during an interval Tb.

FIGS. 4A and 4B are circuit diagrams representing a flow of an electric charge flowing through a circuit constituted of the amplifier AP1, the output switch SW1, the switches Q1 and Q4 included in the demultiplexer DX1 that are extracted from the configuration illustrated in FIG. 2.

As illustrated in FIG. 3, FIG. 4A is a diagram representing the flow of the electric charge flowing through the above-described circuit, in the interval Ta from the time point when the connection control signal SL1 transitions from the logic level 0 to the logic level 1 to an elapse of a predetermined period. Meanwhile, as illustrated in FIG. 3, FIG. 4B is a diagram representing the flow of the electric charge flowing through the above-described circuit, in the interval Tb where both the connection control signals SL1 and SL2 become the state of the logic level 1.

Figure 5:
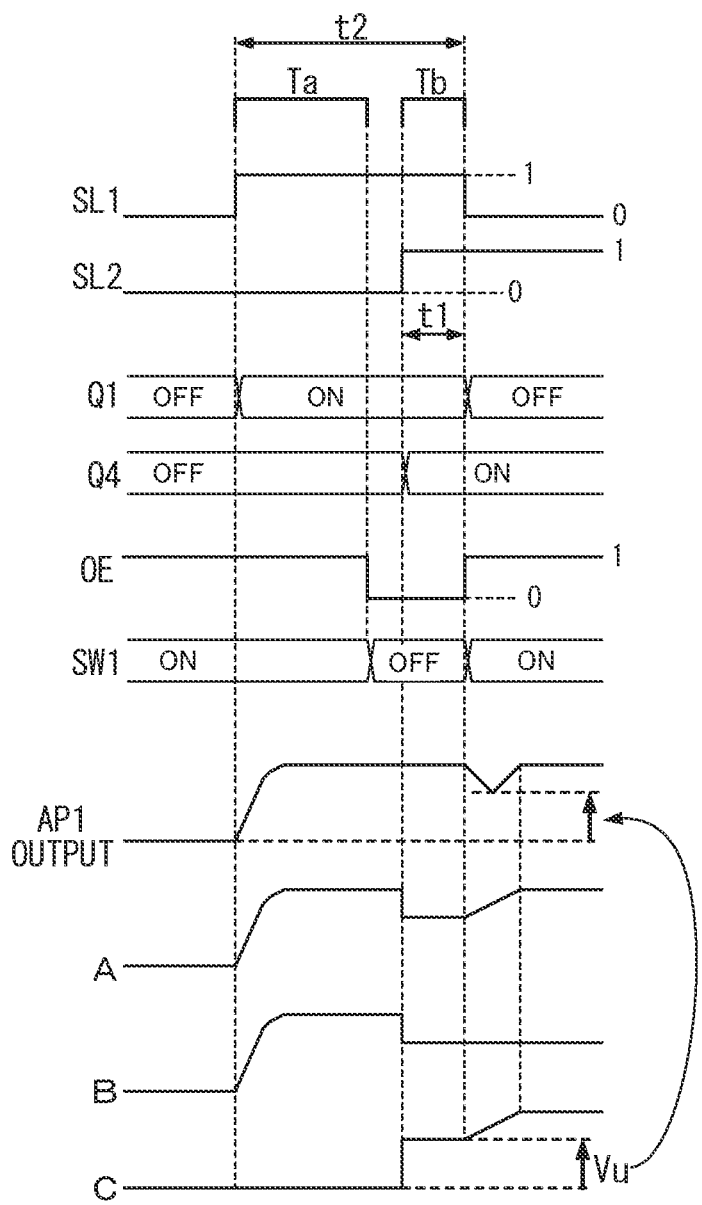
FIG. 5 is a timing chart illustrating one example of waveforms of an output voltage of the amplifier AP1 and voltages of nodes A to C, during the intervals Ta and Tb and at immediately before and after the intervals Ta and Tb.

FIG. 5 is a timing chart illustrating one example of a waveform of an output voltage of the amplifier AP1 and waveforms of the voltages of nodes A to C illustrated in FIG. 4A and FIG. 4B, by extracting the intervals Ta and Tb and immediately before and after the intervals Ta and Tb illustrated in FIG. 3.

First, as illustrated in FIG. 5, while the output switch SW1 is set to the on state on the basis of the output control signal OE at the logic level 1, the switch Q1 transitions from the off state to the on state on the basis of the connection control signal SL1 at the logic level 1. Then, as illustrated by a bold arrow in FIG. 4A, the electric charge based on the driving voltage output from the amplifier AP1 flows into the wiring L1, the switch Q1, and the data line D1 via the output switch SW1. Thus, a parasitic capacitance C0 of the wiring L1 and a parasitic capacitance C1 of the data line D1 are charged, respectively, and, as illustrated in FIG. 5, the voltages of the nodes A and B are raised and reach a voltage value equal to the driving voltage output from the amplifier AP1.

Subsequently, as illustrated in FIG. 5, the output switch SW1 transitions from the on state to the off state on the basis of the output control signal OE at the logic level 0, then, in the interval Tb illustrated in FIG. 5, the switch Q4 transitions from the off state to the on state on the basis of the connection control signal SL2 at the logic level 1. Then, as illustrated in a bold arrow in FIG. 4B, the electric charge accumulated in the parasitic capacitance C0 is discharged and flows into the data line D4 via the switch Q4, and the electric charge accumulated in the parasitic capacitance C1 is discharged and flows into the data line D4 via the switches Q1 and Q4. Thus, as illustrated in FIG. 5, while the voltages of the respective nodes A and B decrease, a parasitic capacitance C4 parasitic on the data line D4 is charged by the electric charge flowing into the data line D4, and the voltage of the node C increases to reach, for example, a voltage Vu as indicated in FIG. 5.

Subsequently, as illustrated in FIG. 5, when the output control signal OE transitions from logic level 0 to logic level 1, and the connection control signal SL1 transitions from logic level 1 to logic level 0, the driving voltage that has been output from the amplifier AP1 is applied to the data line D4 via the output switch SW1 and the switch Q4. At this time, while a charge to the parasitic capacitance C4 of the data line D4 is started by the electric charge in association with the driving voltage, by the charge of the above-described parasitic capacitance C4 performed during the interval Tb immediately before the start, the voltage of the node C, namely, the voltage of the data line D4 is already the voltage Vu.

Consequently, the current delivered to the data line D4 by the amplifier AP1 so as to charge the parasitic capacitance C4 can be reduced by the amount of this voltage Vu. Therefore, power consumption and heat generation of the amplifier AP1 can be reduced, and thus, in association with this, power consumption and heat generation of the data driver 12 can also be reduced.

In the above-described embodiment, as the demultiplexer DMX, the one that includes the 1 to 6 demultiplexers DX1 to DX (m/6) in which each of the 1 to 6 demultiplexers DX1 to DX (m/6) receives the driving voltage series for one system constituted of the series of 6 driving voltages and delivers and supplies the driving voltage series to the respective 6 data lines D is employed. However, as the respective demultiplexers included in the demultiplexer DMX, any component may be used as long as the component delivers and supplies the driving voltage series for one system constituted of the series of first to j-th (j is an integer equal to or more than 2) driving voltages to the respective j data lines D. At this time, as the DMX controller CT2, the one that generates the connection control signals SL1 to SLj in a configuration illustrated in FIG. 3 is employed. In association with this, a count of buffers B illustrated in FIG. 2 also becomes j.

Basically, the data driver 12 illustrated in FIG. 2 as the display driver drives the display device (20) including the plurality of data lines (D1 to Dm) and the demultiplexer (DMX) that receives the series (G) of the first to j-th (j is an integer equal to or more than 2) driving voltages at the single wiring (L) and delivers and supplies each of the first to j-th driving voltages to the j data lines. At this time, as the data driver 12, any component may be used as long as the component includes the amplifier, the output switch, the demultiplexer controller, and the output controller, which are described below.

That is, the outputting amplifier (AP) generates the series of the first to j-th driving voltages and outputs the driving voltages from its own output terminal. The output switch (SW) connects the output terminal of the amplifier to the single wiring (L). The demultiplexer controller (CT2) controls the demultiplexer to sequentially connect each of the j data lines to the single wiring only during the second period (t2) one by one such that two data lines are simultaneously connected to the single wiring (L) only during the first period (t1). The output controller (CT1) controls the output switch (SW) to cut off the connection between the output terminal of the amplifier (AP) and the single wiring (L) during the first period.

In one example illustrated in FIG. 3, when the data lines D are sequentially selected one by one by the connection control signals SL1 to SL6, while two data lines D are simultaneously selected only during the interval Tb, a count of data lines simultaneously selected during the interval Tb is not limited to two.

For example, during the interval Tb, the connection control signals SL1 to SL6 may be set to the logic level 1 such that the 6 data lines D are simultaneously selected each time.

Furthermore, for example, during the interval Tb when the connection control signal SL1 becomes the logic level 1, the connection control signals SL1 to SL6 may be set to the logic level 1 such that the 6 data lines D are simultaneously selected, and during the period T2 when the other connection control signals SL2 to SL6 becomes the logic level 1, the interval Tb may be omitted.

Furthermore, for example, by a structure (for example, a count of display cells constituting one pixel PX, a combination of display colors, or the like) of the pixel of the display device 20, a selection processing where the interval Tb simultaneously selecting the plurality of data lines is disposed and a selection processing where such interval Tb is not disposed may be mixed and executed.

Embodiment 2

Figure 6:
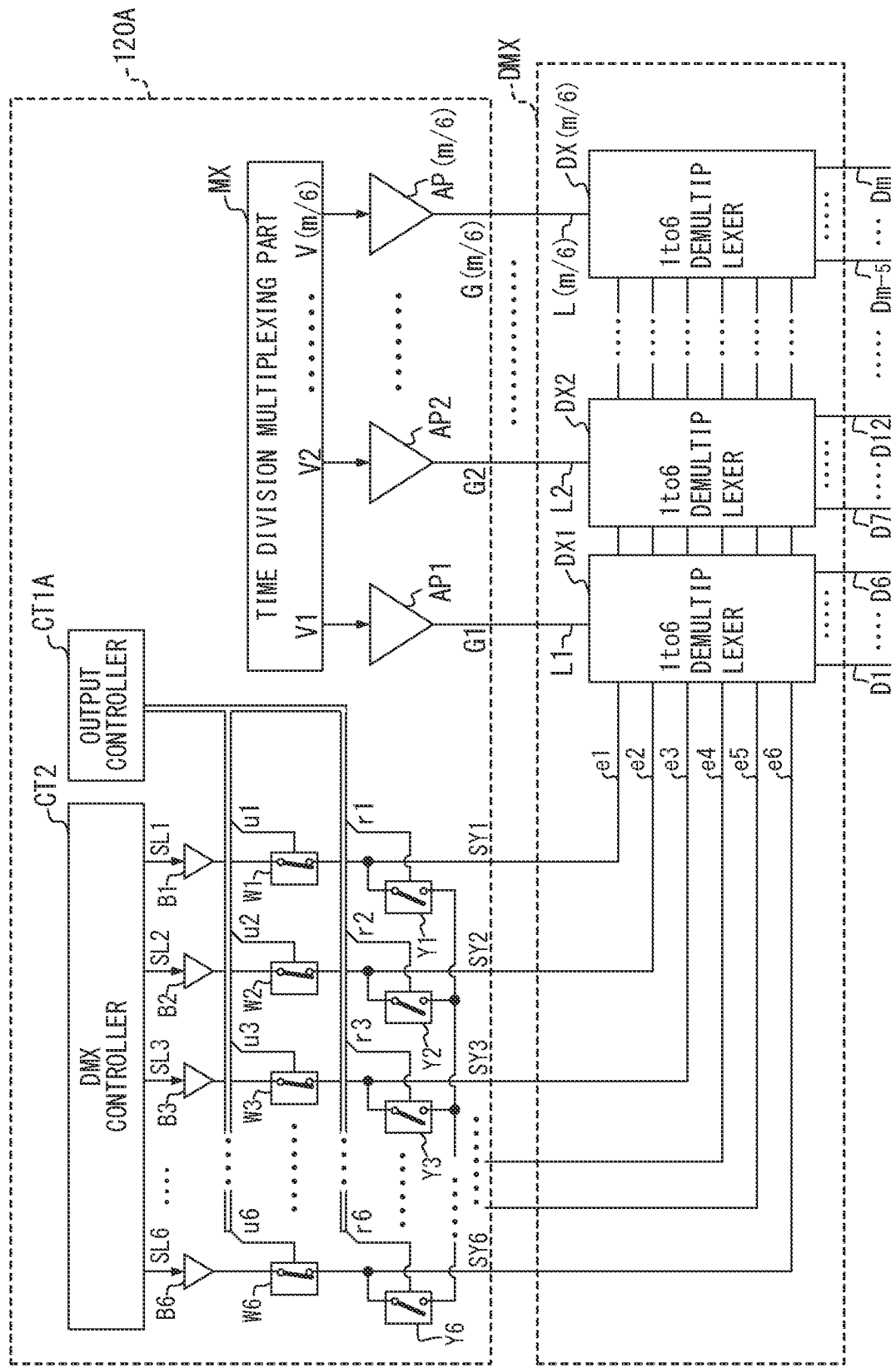
FIG. 6 is a circuit diagram illustrating one example of another configuration of the output part 120 and the demultiplexer DMX.

FIG. 6 is a block diagram illustrating a configuration of an output part 120A as another embodiment of the output part 120 included in the data driver 12. The respective 1 to 6 demultiplexers DX1 to DX (m/6) included in the demultiplexer DMX in FIG. 6 have same configurations as those illustrated in FIG. 2. In the configuration illustrated in FIG. 6, the time division multiplexing part MX, the amplifiers AP1 to AP(m/6), the buffers B1 to B6, and the DMX controller CT2 that perform same operations as the operations performed by those included in the output part 120 in FIG. 2 are used.

Accordingly, detail description for each of the 1 to 6 demultiplexers DX1 to DX(m/6), the Time division multiplexing part MX, the amplifiers AP1 to AP(m/6), and the DMX controller CT2 is omitted.

In the output part 120A, an output controller CT1A is employed instead of the output controller CT1 illustrated in FIG. 2, and output switches W1 to W6 and short-circuiting switches Y1 to Y6 are disposed instead of the output switches SW1 to SW (m/6) connected to the output terminals of the amplifiers AP1 to AP(m/6).

With this, in the output part 120A, the respective driving voltage series output from the amplifiers AP1 to AP(m/6) are directly supplied as the driving voltage series G1 to G(m/6) to the demultiplexer DMX via the wirings L1 to L(m/6).

The output controller CT1A generates output control signals u1 to u6 that individually set the respective output switches W1 to W6 to one of the on state and the off state and supplies them to the output switches W1 to W6. For example, the output controller CT1A supplies the output control signal u1 at the logic level 1 when the output switch W1 is set to the on state and supplies the output control signal u1 at the logic level 0 when the output switch W1 is set to the off state to the output switch W1. The output controller CT1A supplies the output control signal u2 at the logic level 1 when the output switch W2 is set to the on state and supplies the output control signal u2 at the logic level 0 when the output switch W2 is set to the off state to the output switch W2.

Furthermore, the output controller CT1A generates output control signals r1 to r6 that individually set the respective short-circuiting switches Y1 to Y6 to one of the on state and the off state and supplies them to the short-circuiting switches Y1 to Y6. For example, the output controller CT1A supplies the output control signal r1 at the logic level 1 when the short-circuiting switch Y1 is set to the on state and supplies the output control signal r1 at the logic level 0 when the short-circuiting switch Y1 is set to the off state to the short-circuiting switch Y1. The output controller CT1A supplies the output control signal r2 at the logic level 1 when the short-circuiting switch Y2 is set to the on state and supplies the output control signal r2 at the logic level 0 when the short-circuiting switch Y2 is set to the off state to the short-circuiting switch r2.

Each of the output switches W1 to W6 is connected to each output terminal of the buffers B1 to B6 in a one-to-one correspondence, becomes in the on state when the output control signal u supplied to itself is at the logic level 1 representing the on state, and supplies the connection control signal SL supplied from the buffer B connected to itself as the connection control signal SY to the wiring e.

For example, the output switch W1 becomes in the on state when the output control signal u1 is at the logic level 1 and supplies the connection control signal SL1 supplied from the buffer B1 as the connection control signal SY1 to the wiring e1. The output switch W2 becomes in the on state when the output control signal u2 is at the logic level 1 and supplies the connection control signal SL2 supplied from the buffer B2 as the connection control signal SY2 to the wiring e2.

When the output control signal u is at the logic level 0 representing the off state, each of the output switches W1 to W6 becomes in the off state, sets the output terminal of the buffer B to a high impedance state, and cuts off the electrical connection between the output terminal of the buffer B and the wiring e.

For example, when the output control signal u1 is at the logic level 0, the output switch W1 becomes in the off state, sets the output terminal of the buffer B1 to the high impedance state, and cuts off the electrical connection between the output terminal of the buffer B1 and the wiring e1. When the output control signal u2 is at the logic level 0, the output switch W2 becomes in the off state, sets the output terminal of the buffer B2 to the high impedance state, and cuts off the electrical connection between the output terminal of the buffer B2 and the wiring e2.

Each of the short-circuiting switches Y1 to Y6 is connected to the respective wirings e1 to e6 of the demultiplexer DMX in a one-to-one correspondence. Each of the short-circuiting switches Y1 to Y6 becomes in the on state when the output control signal r supplied to itself is at the logic level 1 and short-circuits the wiring e connected to itself and at least one of other wirings e. For example, when the output control signal r1 at the logic level 1 is supplied to the short-circuiting switch Y1, and the output control signal r2 at the logic level 1 is supplied to the short-circuiting switch Y2, the short-circuiting switches Y1 and Y2 short-circuit the wiring e1 and the wiring e2.

Figure 7A:
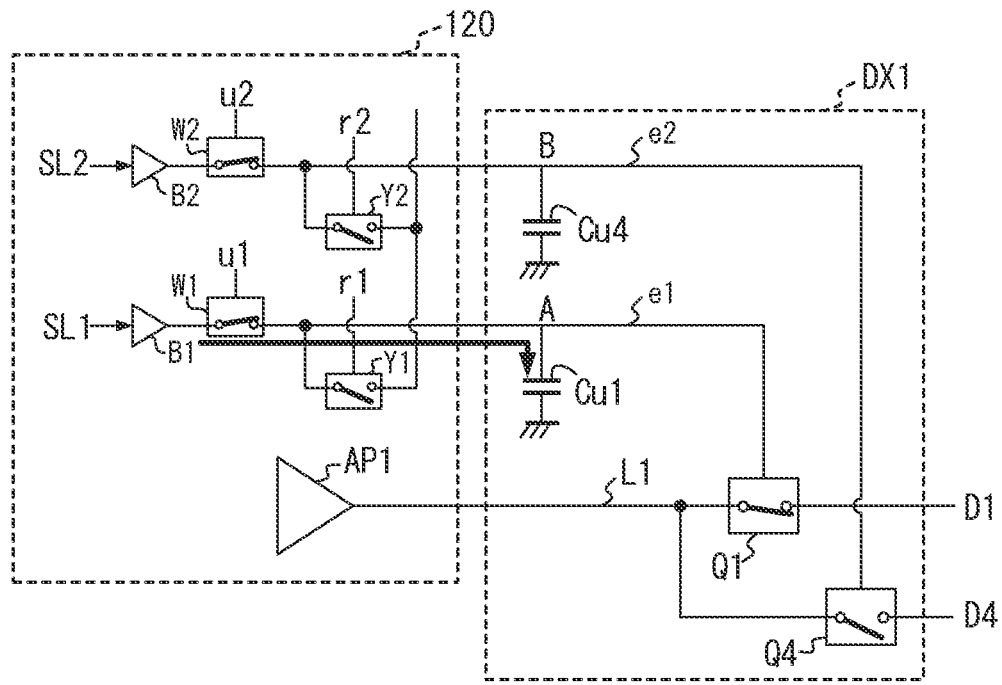
FIG. 7A is a circuit diagram illustrating a flow of an electric charge flowing through a circuit constituted of the amplifier AP1, buffers B1 and B2, output switches W1 and W2, short-circuiting switches Y1 and Y2, and switches Q1 and Q4, during an interval Ta.
Figure 7B:
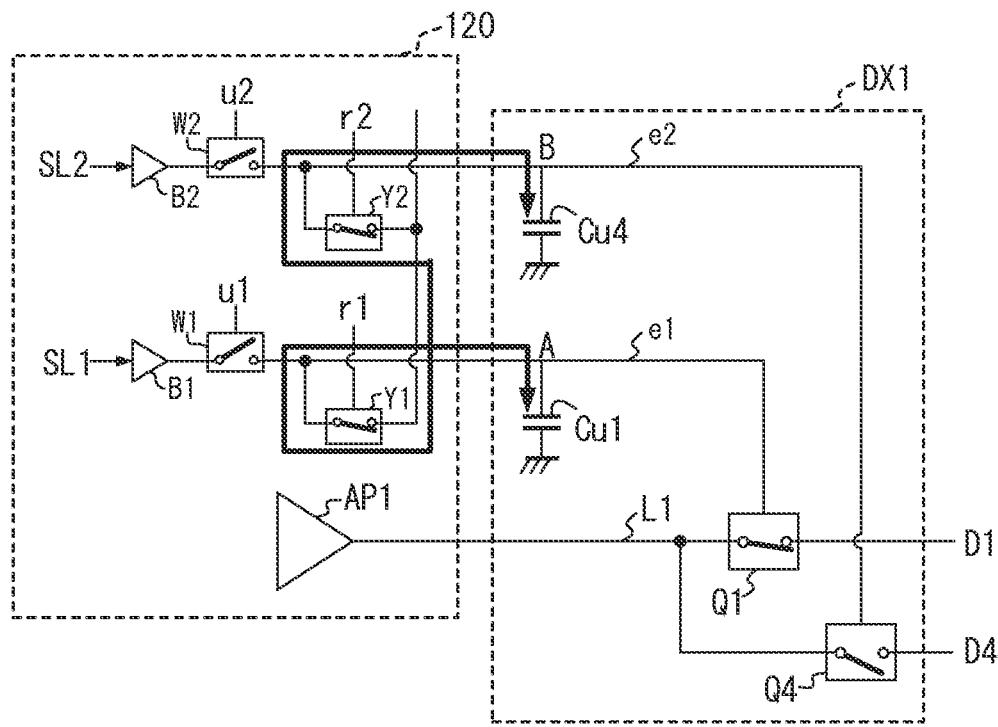
FIG. 7B is a circuit diagram illustrating a flow of an electric charge flowing through the circuit constituted of the amplifier AP1, the buffers B1 and B2, the output switches W1 and W2, the short-circuiting switches Y1 and Y2, and the switches Q1 and Q4, during an interval Tb.

FIGS. 7A and 7B are circuit diagrams illustrating a flow of an electric charge flowing through a circuit constituted of the amplifier AP1, the buffers B1 and B2, the output switches W1 and W2, the short-circuiting switches Y1 and Y2, and the switches Q1 and Q4 included in the demultiplexer DX1 that are extracted from the configuration illustrated in FIG. 6.

As illustrated in FIG. 3, FIG. 7A is a diagram illustrating the flow of the electric charge flowing through the above-described circuit, during the interval Ta from the time point when the connection control signal SL1 transitions from the logic level 0 to the logic level 1 to an elapse of the predetermined period. Meanwhile, as illustrated in FIG. 3, FIG. 7B is a diagram illustrating the flow of the electric charge flowing through the above-described circuit, during the interval Tb from the time point when the connection control signal SL2 transitions from the logic level 0 to the logic level 1 to the time point when the connection control signal SL1 transitions from the logic level 1 to the logic level 0.

Figure 8:
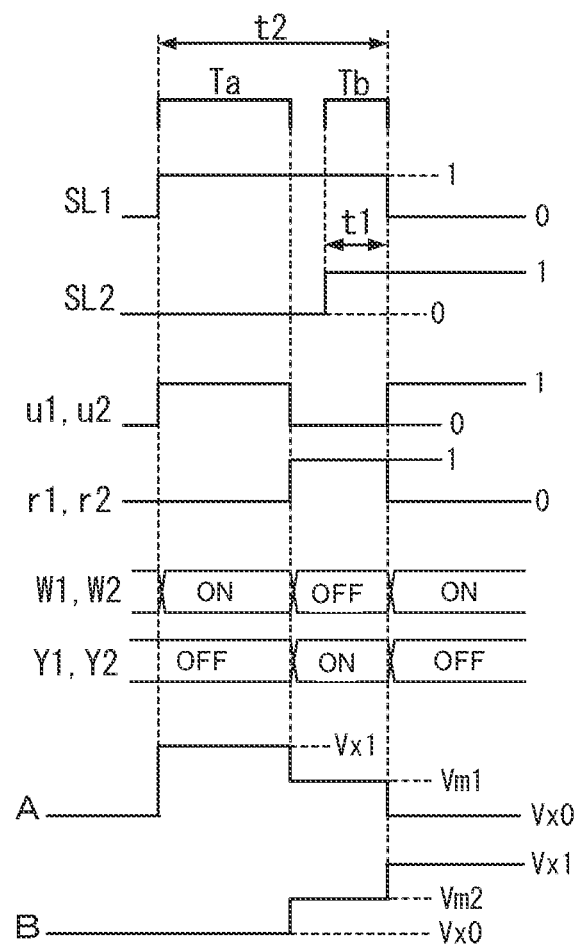
FIG. 8 is timing chart illustrating one example of waveforms of the respective nodes A and B, during the intervals Ta and Tb and at immediately before and after the intervals Ta and Tb.

FIG. 8 is a timing chart illustrating one example of waveforms of the voltages of the nodes A and B illustrated in FIGS. 7A and 7B by extracting the intervals Ta and Tb and periods immediately before and after the intervals Ta and Tb illustrated in FIG. 3.

First, as illustrated in FIG. 8, the output switches W1 and W2 are set to the on state on the basis of the output control signals u1 and u2 at the logic level 1, and short-circuiting switches Y1 and Y2 are set to the off state on the basis of output control signals r1 and r2 at the logic level 0. During this period, first, when the buffer B1 receives the connection control signal SL1 at the logic level 1, as illustrated by the bold arrow in FIG. 7A, the electric charge based on the connection control signal SL1 at the logic level 1 flows into the wiring e1 via the output switch W1. Thus, a parasitic capacitance Cu1 parasitic on the wiring e1 is charged, and, as illustrated in FIG. 8, the voltage of the node A, namely, the voltage of the wiring e1 transitions to a voltage Vx1 corresponding to the logic level 1 by the connection control signal SL1.

Subsequently, as illustrated in FIG. 8, when the output control signals u1 and u2 transition from the logic level 1 to the logic level 0, and the output control signals r1 and r2 transition from the logic level 0 to the logic level 1, both the output switches W1 and W2 transition to the off state, and both the short-circuiting switches Y1 and Y2 transition to the on state (interval Tb).

Thus, as described above, the electric charge accumulated in the parasitic capacitance Cu1 and the electric charge remains in a parasitic capacitance Cu2 parasitic on the wiring e2 discharge, and, as illustrated by the bold arrow FIG. 7B, the total electric charge discharged is divided into two parts for each of the wirings e1 and e2 and flows into each of them via the short-circuiting switches Y1 and Y2. Consequently, the respective parasitic capacitances Cu1 and Cu2 are charged by the electric charge divided into two parts, and, as illustrated in FIG. 8, the voltage of the node A transitions from the voltage Vx1 to an intermediate voltage Vm1 that is lower than the voltage Vx1 and higher than a voltage Vx0 corresponding to the logic level 0. On the other hand, the voltage of the node B, namely, the voltage of the wiring e2 increases to transition to an intermediate voltage Vm2 (Vx0<Vm2<Vx1).

Subsequently, as illustrated in FIG. 8, the connection control signal SL2 transitions from the logic level 0 to the logic level 1, continuously, the output control signals u1 and u2 transition from the logic level 0 to the logic level 1, the output control signals r1 and r2 transition from the logic level 1 to the logic level 0, and the connection control signal SL1 transitions from the logic level 1 to the logic level 0. Thus, the output switches W1 and W2 become in the on state, the short-circuiting switches Y1 and Y2 become in the off state, and, as illustrated in FIG. 8, the voltage of the node A decreases to transition to the voltage Vx0 corresponding to the logic level 0. On the other hand, the voltage of the node B transitions to the voltage Vx1 corresponding to the logic level 1 by the connection control signal SL2.

Thus, when the connection control signal SL1 transitions from the logic level 1 to the logic level 0, the voltage of the node A, namely, the voltage of the wiring e1 transitions from the voltage Vx1 corresponding to the logic level 1 to the voltage Vx0 corresponding to the logic level 0. When this voltage transition is performed, in the configuration illustrated in FIG. 6, the electrical connection between the buffer B1 and wiring e1 and the electrical connection between the buffer B2 and the wiring e2 are cut off, and the wiring e1 is electrically connected to the wiring e2. This causes the electric charge accumulated in the parasitic capacitance Cu1 parasitic on the wiring e1 to be discharged and causes the voltage of the wiring e1 to be decreased up to the intermediate voltage Vm1 (Vx0<Vm1<Vx1).

Consequently, until the voltage of the wiring e1 is decreased from the state of the voltage Vx1 to the intermediate voltage Vm1, the current flowing into the buffer B1 is zero, and thus, power consumption in the buffer B1 and heat generation of this buffer can be reduced by that amount. Therefore, because power consumption and heat generation of the buffer B1 can be reduced, in association with this, power consumption and heat generation of the data driver 12 also can be reduced.

As illustrated in FIG. 8, the voltage of the node B, namely, the voltage of the wiring e2 transitions from the voltage Vx0 corresponding to the logic level 0 to the voltage Vx1 corresponding to the logic level 1 when the connection control signal SL2 output from the buffer B2 transitions from the logic level 0 to the logic level 1. When this voltage transition is performed, in the configuration illustrated in FIG. 6, the electrical connection between the buffer B1 and wiring e1 and the electrical connection between the buffer B2 and the wiring e2 are cut off, and the wiring e1 is electrically connected to the wiring e2. Thus, the parasitic capacitance Cu2 parasitic on the wiring e2 is charged by forcibly discharge the electric charge accumulated in the parasitic capacitance Cu1 parasitic on the wiring e1 and flowing the electric charge into the wiring e2. By such charge, the voltage of the wiring e2 increases from the voltage Vx0 corresponding to the logic level 0 up to the intermediate voltage Vm2 (Vx0<Vm2<Vx1).

Consequently, until the voltage of the wiring e2 increases from the state of the voltage Vx0 to the intermediate voltage Vm2, the current output from the buffer B2 becomes zero, and thus, power consumption of the buffer B2 and heat generation of this buffer B2 can be reduced by that amount. Therefore, because power consumption and heat generation of the buffer B2 can be reduced, in association with this, power consumption and heat generation of the data driver 12 also can be reduced.

In the above-described embodiment, as the demultiplexer DMX, the one that includes the 1 to 6 demultiplexers DX1 to DX (m/6) in which each of the 1 to 6 demultiplexers DX1 to DX (m/6) receives the driving voltage series for one system constituted of the series of 6 driving voltages and delivers and supplies the driving voltage series to the respective 6 data lines D is employed. However, as the respective demultiplexers included in the demultiplexer DMX, any component may be used as long as the component delivers and supplies the driving voltage series for one system constituted of the series of first to j-th (j is an integer equal to or more than 2) driving voltages to the respective j data lines D. At this time, as the DMX controller CT2, the one that generates the connection control signals SL1 to SLj in a configuration illustrated in FIG. 3 is employed. In association with this, a count of buffers B illustrated in FIG. 6 also becomes j, and counts of output switches W and short-circuiting switches Y are also j, respectively.

Basically, the data driver 12 illustrated in FIG. 6 as the display driver drives the display device (20) including the plurality of data lines (D1 to Dm) and the demultiplexer (DMX) that receives (G) the series of the first to j-th (j is an integer equal to or more than 2) driving voltages at the single wiring (L) and delivers and supplies each of the first to j-th driving voltages to the j data lines. As the data driver 12, any component may be used as long as the component includes the amplifier, the demultiplexer controller, the first to j-th output switches, a short-circuiting switch part, and the output controller, which are described below.

That is, the demultiplexer controller (CT2) generates the first to j-th connection control signals (SL) that instruct to sequentially connect each of the j data lines to the single wiring one by one only during the second period (t2) such that two data lines are simultaneously connected to the single wiring (L) only for the first period (t1). The first to j-th buffers (B) individually amplifies the first to j-th connection control signals (SL) to output from the respective output terminals. The first to j-th output switches (W) individually connect the output terminal of each of the first to j-th buffers (B) to the first to j-th wirings (e). The short-circuiting switch part (Y) short-circuits or open the first to j-th wirings (e). The output controller (CT1) controls the first to j-th output switches such that, during the first period (t1), the connections between the output terminals of the respective first to j-th buffers (B) and the first to j-th wirings (e) are cut off. Furthermore, during first period (t1), the output controller (CT1) controls the short-circuiting switch part to cause the first to j-th wirings (e) to be short-circuited one another.

DESCRIPTION OF REFERENCE SIGNS

12 Data driver
20 Display device
120 Output part
AP1 to AP(m/6) Amplifier
B1 to B6 Buffer
CT1 Output controller
CT2 DMX controller
DMX Demultiplexer
MX Time division multiplexing part
Q1 to Q6 Switch
SW1 to SW(m/6), W1 to W6 Output switch
Y1 to Y6 Short-circuiting switch

The invention claimed is:
1. A display driver that drives a display device including a plurality of data lines and a demultiplexer that receives a series of first to j-th driving voltages, wherein j is an integer equal to or more than 2, at a single wiring and receives first to j-th connection control signals at respective first to j-th wirings, the demultiplexer including first to j-th switches that individually connect or cut off the single wiring and respective j data lines on the basis of the first to j-th connection control signals, the display driver comprising:

a demultiplexer controller that generates the first to j-th connection control signals, the first to j-th connection control signals instructing to sequentially connect each of the j data lines to the single wiring one by one only during a second period such that two data lines are simultaneously connected to the single wiring only during a first period;

first to j-th buffers that individually amplify the first to j-th connection control signals to output the first to j-th connection control signals from respective output terminals;

first to j-th output switches that individually connect the output terminals of respective first to j-th buffers to the first to j-th wirings;

a short-circuiting switch part that short-circuits or opens the first to j-th wirings; and an output controller that controls the first to j-th output switches such that, during the first period, connections between the respective output terminals of the first to j-th buffers and the first to j-th wirings are cut off, and controls the short-circuiting switch part to cause the first to j-th wirings to be short-circuited by one another.

2. The display driver according to claim 1, further comprising a time division multiplexing part that receives j gradation voltages each of which represents a voltage corresponding to a luminance level of each pixel and generates a series of the first to j-th driving voltages obtained by time division multiplexing the j gradation voltages.

3. A display apparatus comprising:

a display device that includes a plurality of data lines and a demultiplexer that receives a series of first to j-th driving voltages, wherein j is an integer equal to or more than 2, at a single wiring and receives first to j-th connection control signals at respective first to j-th wirings, the demultiplexer including first to j-th switches that individually connect or cut off the single wiring and respective j data lines on the basis of the first to j-th connection control signals; and a display driver that includes:

a demultiplexer controller that generates the first to j-th connection control signals, the first to j-th connection control signals instructing to sequentially connect each of the j data lines to the single wiring one by one only during a second period such that two data lines are simultaneously connected to the single wiring only during a first period;

first to j-th buffers that individually amplify the first to j-th connection control signals to output the first to j-th connection control signals from respective output terminals;

first to j-th output switches that individually connect the output terminals of respective first to j-th buffers to the first to j-th wirings;

a short-circuiting switch part that short-circuits or opens the first to j-th wirings; and an output controller that controls the first to j-th output switches such that, during the first period, connections between the output terminals of the respective first to j-th buffers and the first to j-th wirings are cut off and controls the short-circuiting switch part to cause the first to j-th wirings to be short-circuited by one another.

\* \* \* \* \*